United States Patent [19]

Gillon et al.

[11] Patent Number: 4,922,348
[45] Date of Patent: May 1, 1990

[54] FACSIMILE SERVICE

[75] Inventors: Alexander C. Gillon, Bedminster; Adam V. Reed, Morganville; John M. Scanlon, Mendham, all of N.J.

[73] Assignee: American Telephone and Telegraph Company, New York, N.Y.

[21] Appl. No.: 309,586

[22] Filed: Feb. 10, 1989

[51] Int. Cl.[5] .......................... H04N 1/32; H04N 1/21
[52] U.S. Cl. .................................. 358/407; 358/434; 358/440; 358/442
[58] Field of Search ............... 358/400, 402, 403, 404, 358/407, 434, 438, 440, 442

[56] References Cited

U.S. PATENT DOCUMENTS

| 3,920,895 | 11/1975 | Vieri et al. | 358/407 |
| 4,532,554 | 7/1985 | Skala | 358/434 |
| 4,586,086 | 4/1986 | Ohzeki | 358/407 |

OTHER PUBLICATIONS

"Enhanced WorkGroup System Products", AT&T (Manufacturer's Brochure), 1988, pp. 1-4.
"AT&T Fax Connection", AT&T (Manufacturer's Brochure), 1988, pp. 1-2.
"BIT-IV", NEC (Manufacturer's Brochure), 1988, pp. 1-4.
"Telematic Services: Operations and Quality of Service", *CCITT Red Book*, vol. II-Fascicle II.5, Recommendations F.160-F.350, VIIIth Plenary Assembly, Malaga-Torremolinos, Oct. 8-19, 1984.

Primary Examiner—James J. Groody
Assistant Examiner—Randall S. Svihla
Attorney, Agent, or Firm—Werner Ulrich

[57] ABSTRACT

This invention relates to an arrangement for efficiently transmitting facsimile signals from a facsimile source to a facsimile destination using a standard facsimile user interface. The connected switched communications network recognizes that the call is from a facsimile source or to a facsimile destination and causes the facsimile signals to be transmitted at the transmission speed of the source to storage in a network. Subsequently, the signals are transmitted from storage to a facsimile destination at the transmission speed of the destination when the destination becomes available. Advantageously, the source need not wait for the destination to become available before transmitting, and the transmission can take place at a bit rate that matches the source and the destination even when these bit rates are different. Retransmission because of errors in one link is only required for that link, i.e., from the source to the storage or from the storage to the destination. Advantageously, this is accomplished without changing the very simple user interface of prior art facsimile transceivers.

25 Claims, 5 Drawing Sheets

ORIGINATING SWITCH ACTIONS

FACSIMILE SERVICE

TECHNICAL FIELD

This invention relates to the commnication of facsimile data.

PROBLEM

Use of facsimile (fax) machines for transmission of documents is expanding very rapidly. Most of this use of facsimile service is for low resolution (200×100 or 200×200 dots per inch) machines that are relatively inexpensive and that print their output on relatively low quality thermal paper. The data representing the image of the document is normally sent as analog data (9600 bits per second) over conventional communications transmission facilities. The result is a serviceable moderate speed arrangement especially suitable for transmission of small quantities of documents between end users because the low cost of the fax machines makes it possible to distribute them widely among these end users. A disadvantage of this arrangement is that the calling and called terminals must be available simultaneously.

At the same time, there is increasing interest in the use of high quality and quantity facsimile service for transmitting documents between much less widely distributed computers or personal computers equipped with facilities for generating high quality image output. For such systems, a high quality printer is used. The resolution is improved to 400×400 dots per inch and the data is normally arranged to be transmitted over digital facilities at 56,000 or more bits per second. Printing is done by high resolution, high quality laser printers that are also used for producing text output from the computers they serve. Sometimes such computer systems further have associated data storage for storing an image that is to be transmitted to one or more destinations. The computer systems can be adapted by special interface equipment to accept 9600 bit per second analog input data from low cost fax machines. However, such input requires that the special interface equipment be available, ties up the input thereto for the duration of the slower transmission, and makes that input unavailable to transmission from other low cost fax machines.

Facsimile systems with intermediate storage are available. When used with a common carrier, these systems are accessed by dialing a special number, plus the source and destination facsimile numbers. A facsimile message is then sent to the storage point from which the message is delivered at a latter time when the equipment of the destination facsimile number is available. Such a system has the disadvantage that a customer is forced to dial three numbers so that, in practice, the customer only uses that service after having tried and failed to get a direct connection to the destination. For a widely used service with many short calls, use of such cumbersome procedures is a significant commercial drawback.

A problem of the prior art is that there are no convenient arrangements using standard procedures for transmitting documents efficiently from widely-distributed, inexpensive, standard-quality facsimile machines at any time to any receiver, including a receiver with an associated printing machine to achieve the kind of quality printing that is only obtainable with expensive printers.

SOLUTION

The above problem is solved and an advance is made in facsimile systems in accordance with one exemplary embodiment of the invention wherein a facsimile call set up by dialing only a destination number is automatically routed to data storage facilities of a switched network, and wherein the stored facsimile data is transmitted therefrom to a facsimile destination. The switched network can be a private switched network, a public switched network or a private branch exchange (PBX). In accordance with one aspect of the invention, the source is recognized by a switch connected to that source to be a facsimile source so that the call may be routed to the data storage. Advantageously, such an arrangement permits users to use a standard facsimile procedure and relatively inexpensive, widely distributed optical scanners for transmitting a document at one speed and permits the output to be transmitted to a destination at a different speed, frequently higher, and/or a different protocol. The output can be printed at a smaller number of concentrated high quality printers whose high cost can be readily absorbed because they are available anyway for the computers that they serve and because each serves a plurality of users. Advantageously, transmission of an image can be carried out conveniently at any time and does not depend upon the immediate availability of the receiving equipment. Advantageously, retransmission from the transmitter does not tie up the receiving equipment.

In accordance with one aspect of the invention, the computers associated with the printers are connected to a digital network using the digital communications protocol (DCP) or the integrated services digital network (ISDN) facilities for transmitting and storing the facsimile signal. Advantageously, such an arrangement permits these computers and their associated printers to receive data at a 64 kilobit per second data rate characteristic of the ISDN standard B-channels even when the data is originally transmitted at a lower rate, for example, from an optical scanner connected to the public network by analog facilities. Advantageously, such a data switching arrangement can further be arranged to distribute a facsimile document to a plurality of destinations with only one transmission from any source, such as a 9600 bit per second simple facsimile machine. Advantageously, such a data switching arrangement can be used to store data until the interface to computers associated with the high quality printers are available to receive data from the data switching system for printing the document represented by the facsimile signals. Advantageously, transmission to storage may take place at one bit rate, for example, 9600 bits per second, and transmission from storage to the destination may take place at a different bit rate, for example, 64 Kbits per second.

In accordance with another aspect of the invention, the storage facilities are directly accessed within a PBX. Advantageously, the storage facilities of that PBX are used for storing facsimile data from other PBX's or terminals connected directly or via a network, and for retransmitting that data at an appropriate time to another terminal.

Therefore, in accordance with the principles of this invention, facsimile image signals are transmitted from facsimile sources using a simple standard user interface to facsimile destinations over a switched network comprising data storage facilities for use as needed to provide the desired data transmission speed and the desired distribution to the facsimile users.

DETAILED DESCRIPTION

Figure 1:
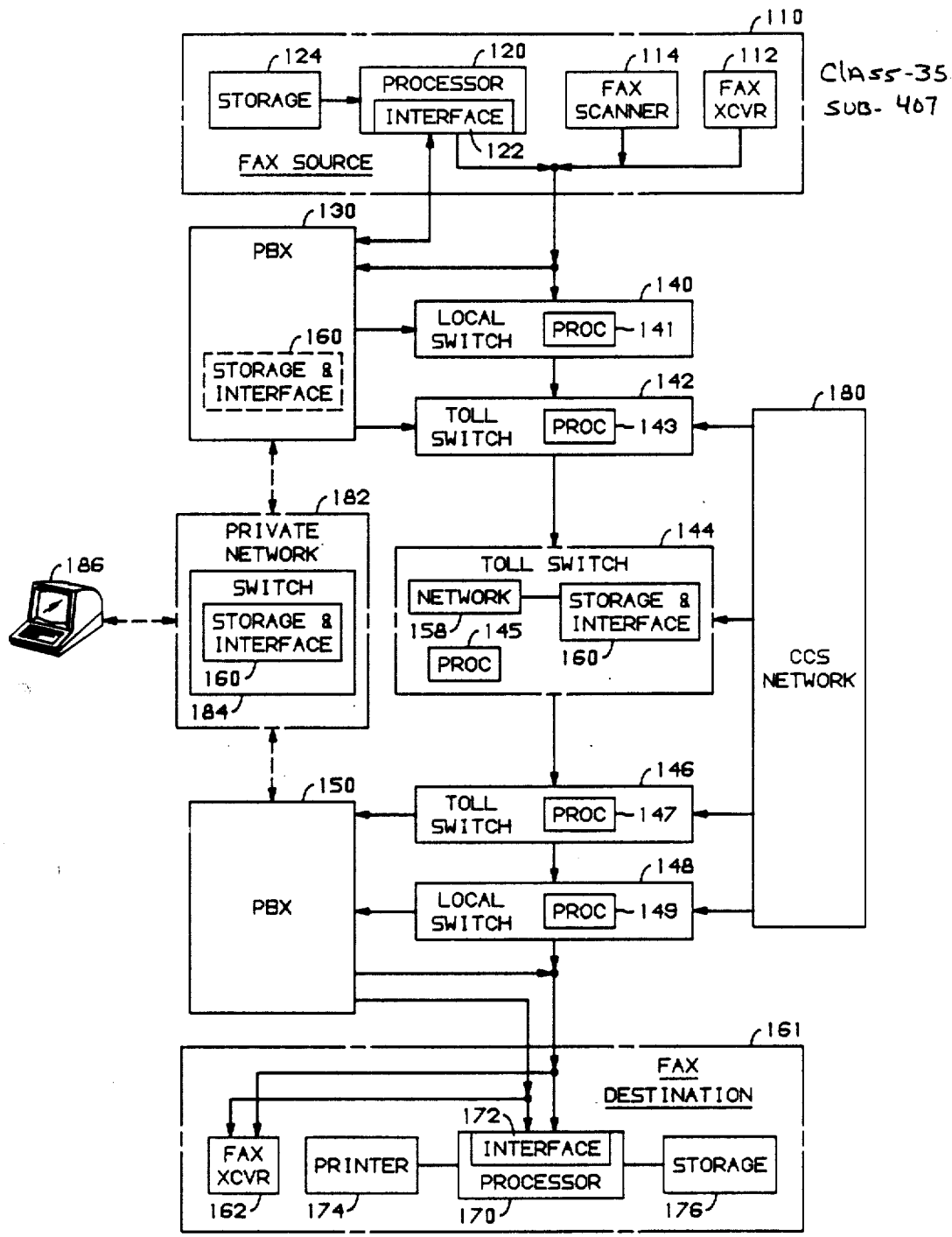
FIG. 1 is a block diagram of an exemplary system for offering facsimile service.

FIG. 1 is a block diagram of a system for practicing applicants' 's invention. A source of facsimile signals 110 is connected by an output bit stream operating at 9.6, 56, 64, or 128 kilobits per second. The source of the signals is one of a fax transceiver 112, a fax scanner 114 which can only be used as a transmitting device, or a processor 120 equipped with an interface 122. The processor is a personal computer such as the AT&T WGS 6300. The function of interface 122 is to send and receive digital facsimile data. This interface may be an AT&T PC-FX CONNECTION card, which can send and receive digital facsimile data at rates up to 9.6 Kbps using modulation compatible with the ISO Group 3 telefacsimile standard over analog facilities; and/or an AT&T PC-PBX CONNECTION CARD, which can send and receive digital data at rates up to 64 Kbps over one DCP channel; and/or an AT&T PC-ISDN CONNECTION card, which can send and receive digital data at rates up to 128 Kbps over one, two, or all three channels of an ISDN Basic Rate (BRI) Interface; and/or any other interface capable of sending and receiving digital data. The processor is provided with an interface 122. In addition, the processor is connected to storage 124 which is used for storing facsimile as well as other data.

The 9.6 kilobit output is the standard bit rate for transmitting facsimile signals over an analog facility. 56 kilobit signals are used for transmitting data over digital facilities such as the AT&T ACCUNET Switched Digital Service. 64 or 128 kilobit transmission is provided by the use of one or two B-channels of an integrated services digital network (ISDN) or of a Digital Communications Protocol (DCP) facility.

The fax source is connected via a transmission facility to a switch with storage and interface 160, either directly or through any number of intervening switches. In the example shown, the fax source is connected via a transmission facility to a local switch 140 or, alternatively, is connected through a PBX 130 to either a local switch 140 or directly to a toll switch 142. The local switch 140 is connected to the toll switch 142. Automatic number identification (ANI) facilities in local switch 140 are used to identify the number of the facsimile source, and to forward this number to toll switch 142; the ANI number is then forwarded to toll switch 144 via a common channel signaling (CCS) message. When a fax call is recognized, the fax signal is sent from this toll switch 142 to a second toll switch 144. The second toll switch 144 comprises a switching network 158 and storage and interface 160. The storage and interface 160 is shown in detail in FIG. 2. Thus, facsimile signals from the facsimile source 110 are connected through local switch 140, and toll switches 142 and 144 to the storage and interface of toll switch 144. Each of the switches 140, 142, 144, 146 and 148 comprises a program controlled processor, 141, 143, 145, 147 and 149, respectively, each processor comprising a program for controlling the processor and data storage. While in this specific embodiment of the invention a distinction is made between local switches, toll switches and PBX's, in alternative embodiments, functions performed herein in a local or toll switch may be performed within a PBX.

The advantage of sending facsimile signals to storage as opposed to a destination include the following:

1. If retransmission is required, the terminating facsimile machine is not involved.

2. The transmission to storage is at the bit rate of the facsimile source and the facility connecting that source to the local switch. If the facsimile destination requires or can accept a different bit rate then this latter bit rate may be used in transmitting facsimile data from storage to a destination.

3. If the destination is unavailable, the facsimile signals can be stored until the destination becomes available.

The contents of the storage and interface 160 are subsequently transmitted to a toll switch 146, thence to local switch 148, and finally to a facsimile destination 161. Again, a PBX or any number of switches, or no switches may be interposed, either between the toll switch 146 and the facsimile destination, or between the local switch 148 and the facsimile destination 161. The facsimile destination 161 may be a facsimile transceiver 162 or a processor 170 connected to the transmission facility via an interface 172. The interface 172 is the same type of interface as interface 122. The processor is connected to a printer 174 for printing the received facsimile image and to storage 176 in case it is desired to store either instead of printing or in addition to printing the facsimile image.

Common channel signaling (CCS) network 180 is used to send signaling message among switches 142, 144, 146, and 148. A connection from CCS network 180 to local switch 140 is also provided in some cases, but in the specific embodiment of this example, is not provided. In this example, toll switch 142 performs the originating switch functions described in FIG. 3, and local switch 148 performs the terminating functions described in FIG. 5.

An additional advantage of sending facsimile signals to storage is that if additional data for specifying a plurality of destinations is provided, the facsimile signals can be sent from storage to that plurality of destinations whenever they become available.

Figure 2:
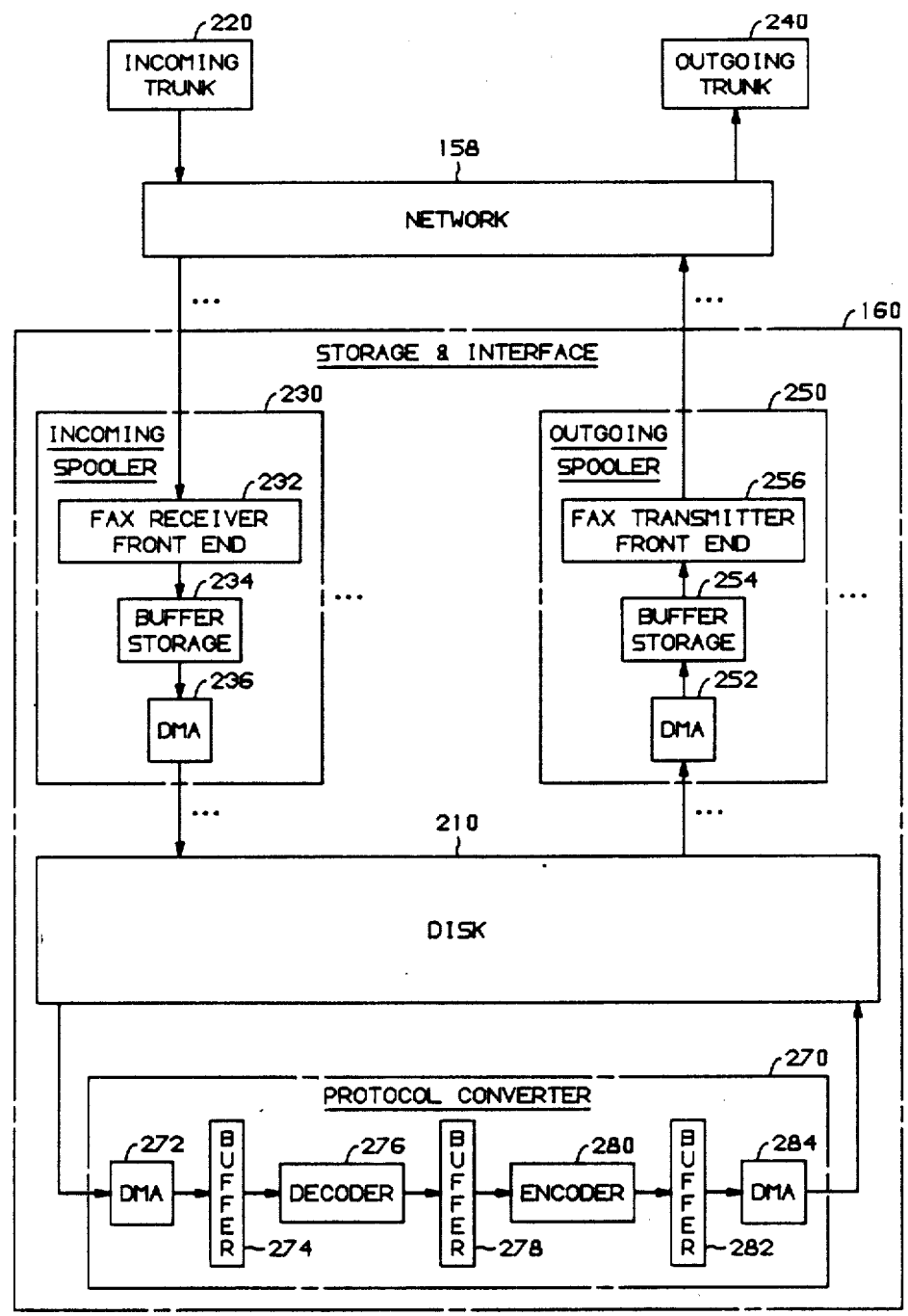
FIG. 2 is a block diagram of an exemplary system for interfacing a digital storage unit with the system of FIG. 1.

FIG. 2 is a detailed diagram of storage and interface 160. Facsimile signals come into toll switch 144 via an incoming trunk 220 connected to toll switch 142; facsimile signals leave toll switch 144 via an outgoing trunk 240 connected to toll switch 146. Either incoming tank 220 or outgoing trunk 240 or both may be two-way trunks. The trunks are connected to storage and interface unit 160 via the switching network 158 of toll switch 144. Incoming signals are directed to an incoming spooler 230. The spooler comprises a facsimile receiver front end for interfacing with facsimile signals and for receiving and generating the proper protocol signals for establishing communications with a facsimile transmitter of facsimile source 110. The received facsimile signals are passed by facsimile receiver front end 232 to buffer storage and thence via a direct memory access unit to a bulk storage disk 210. Similarly, the contents of bulk storage disk 210 are transmitted via an outgoing spooler 250 via network 159 to outgoing trunk 240 which is connected to toll switch 146. The outgoing spooler 250 comprises a direct memory access unit for interfacing between the disk and a buffer storage 254 and a facsimile transmitter front end 256 for taking the output of buffer storage 254 and transmitting the contents of this buffer storage to outgoing trunk 240. The facsimile transmitter or receiver front end performs the same functions as the front end of a full conventional facsimile transmitter or transceiver; it generates the protocol signals for estblishing a channel to a facsimile destination 161 or source 110, and performs all the other functions specified in the International Standards Organization (ISO) Group 3 Telefacsimile standard, except for taking outgoing data from storage 160 instead of scanning it from paper and storing incoming data in storage 160 instead of printing it on paper. This front end is a computer system incorporating the AT&T PC-FAX CONNECTION card and its associated software, or can be any other system performing these functions.

In addition, storage and interface unit 160 comprises an optional protocol converter for converting between different facsimile protocols, for example, for converting between Group 3 and Group 4 facsimile protocol. The output of the disk is received by direct memory access unit 272 and stored in buffer 274. The contents of the buffer are decoded from the incoming protocol by decoder 276 and stored in full image form in buffer 278. The contents of buffer 278 are then re-encoded in the outgoing protocol in encoder 280 for storage in buffer 282 and the contents of buffer 282 are stored via direct memory access unit 284 back into disk 210 in the changed protocol format.

Figure 3:
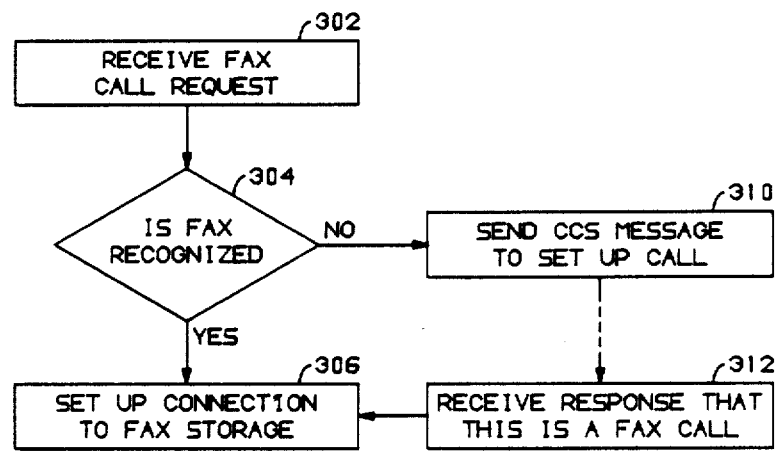
FIGS. 3–5 are flow diagrams of a method of communicating facsimile data in accordance with the principles of this invention.

FIG. 3 is a flow diagram of the actions performed in an originating switch. These actions may be performed either in the local switch 140 or toll switch 142. In a private network these actions can be performed in a PBX switch. If local switch 140 is equipped with access to the common channel signaling network 180, then the actions of FIG. 3 are performed in local switch 140. Otherwise, and in this specific example, they are performed in toll switch 142 which is connected to CCS network 180. The fax call request is received (action block 302). If the call request contains data indicating that this is a fax call, then the result of test 304 is that fax is recognized and a connection is set up to the fax storage 160 (action block 306). The fact that this is a fax call can be recognized from the class of service of the calling customer's line. Alternatively, a code could be supplied with the call to identify that this is a fax call. If fax is not recognized in test 304 then a CCS message is sent to set up the call (action block 310). If this is a fax call, then a response is received to the CCS message sent in action block 310 that, identifying the call as a fax call (action block 312), and a connection is set up to facsimile storage (action block 306).

Figure 4:
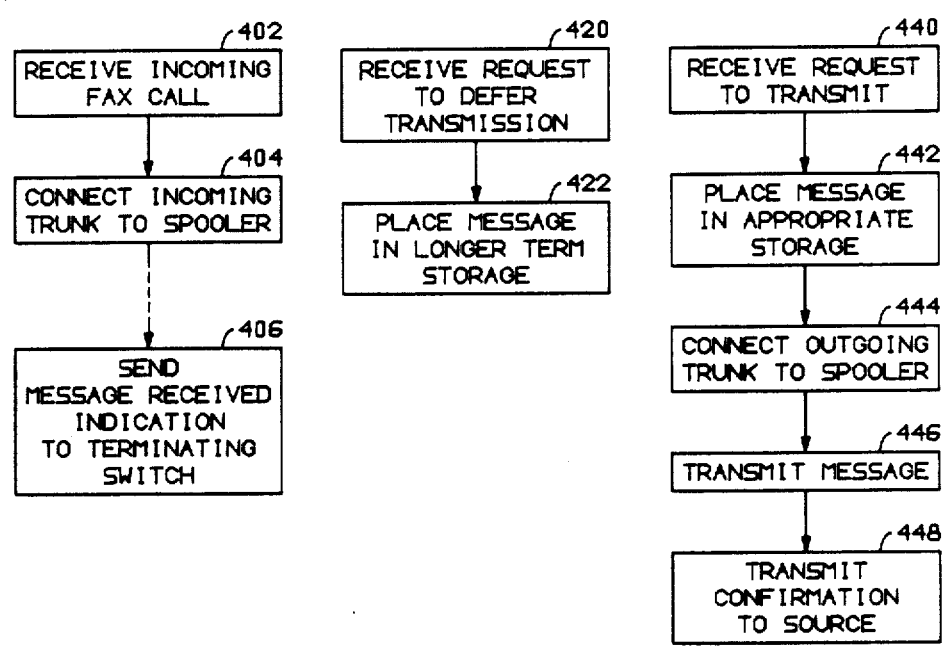

FIG. 4 is a group of flow diagrams for actions performed in the storage switch, in this case, toll switch 144. In other networks, a local or tandem switch can contain the storage. In a private network, this storage can be contained in a PBX switch. An incoming fax call is received (action block 402). The call comprises the identification of the destination, provided by the dialed directory number, the source identification, provided by automatic number identification (ANI) from the local switch, and the facsimile signals. All of these are stored. The incoming trunk 220 associated with this call is connected to an incoming spooler 230 for storage in disk 210. After the facsimile message has been received, a message received indication is sent to the terminating switch (action block 406) via the CCS network 180.

If toll switch 144 receives a request to defer transmission of a particular facsimile message (action block 420), this message is logged in and placed in longer term storage (not shown) for retransmission in responnse to a later request (action block 422).

When toll switch 144 receives a request to transmit a message (action block 440) the message is placed in appropriate storage if it has been previously placed in long term storage (action block 442), and an outgoing trunk 240 for connection to the facsimile destination is connected to outgoing spooler 250 (action block 444). The request message comprises an indication of the protocol used for communicating with the destination. The facsimile message is then transmitted to a facsimile destination (action block 446). The message is transmitted at the speed, e.g., 9.6 or 56 kb/sec., and protocol requested by the facsimile destination. A confirmation message is then transmitted to the facsimile source, identified from the ANI data previously stored, if the transmitting spooler front end receives a confirmation from the destination (action block 448).

Figure 5:
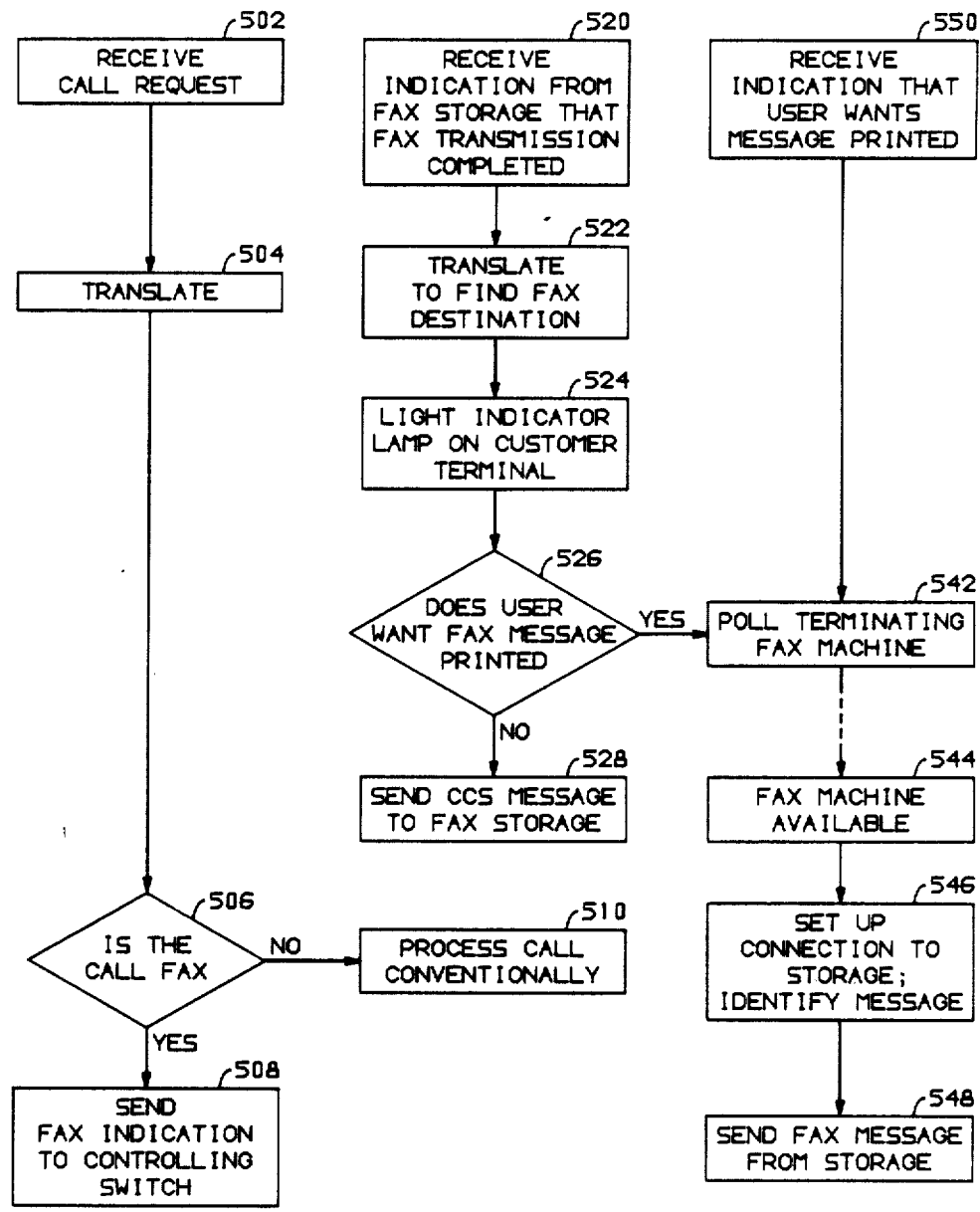

FIG. 5 comprises a group of flow diagrams of actions performed in the terminating switch. The terminating switch in this example is local switch 148 which has access to the CCS network 180. In a private network, this switch can be a PBX switch. A call request is received over CCS network 180 (action block 502). The call request comprises the directory number of the terminating customer, which terminating number is translated (action block 504). The results of the translation are examined in test 506 to see if the call is a facsimile call. If the result of test 506 is positive, then a facsimile indication message is sent to the controlling originating switch (action block 508), in this particular case toll switch 142, so that that switch can arrange to set up a connection to toll switch 144 to allow the facsimile message to be stored. If this is not a facsimile call, (negative result of test 506) then the call is processed conventionally and such conventional processing (action block 510) is not part of this invention.

After transmission of a facsimile message to facsimile storage has been completed, the toll switch 144 sends a message to the terminating switch as previously described with respect to action block 406. This message is received (action block 520) in the terminating switch. The terminating switch translates the directory number to find the facsimile destination (action block 522). This facsimile destination need not be associated with the terminating customer but may be a destination such as a computer used to serve a number of terminating customers. However, another output of the translation in the address of a customer station which can be alerted that a facsimile message has been received in network storage. For such customers, a light on the customer terminal can be turned on (action block 524) in order to advise the customer of the received message. The terminating switch then queries the customer whether the customer wants the facsimile message printed (test 526). If not, a CCS message is sent to facsimile storage in toll switch 144 to retain the message rather than transmitting it; in response toll switch 144 performs the actions previously described with respect to action blocks 420 and 422. If the user wants the fax message printed, then the terminating facsimile machine is polled to see if it is available (action block 542). When the terminating facsimile machine is or becomes available (action block 544), a connection is set up between toll switch 144 and the facsimile destination (action block 546). The connection message identifies the fax message in order to make sure that the right message is retrieved from storage and sent. This message is identified to toll switch 144. Toll switch 144 then sends the facsimile message from storage to the facsimile destination (action block 548).

The specific example described herein uses storage in a public switched network. In accordance with the principles of this invention, the storage may be a part of a private network, either within a PBX switch, as shown by the insertion of block 160 (indicated in dashed lines to show it is an alternative embodiment) within PBX 130 (FIG. 1), or within a switch 184 of a private network 182 used for interconnecting PBX's 130 and 150. A terminal such as terminal 186 can also be directly connected to such private network 182.

In alternative embodiments of the invention, the network can first try to establish a direct connection, and revert to the connection to storage if the destination is not available, or if the class of the destination is such that a transmission speed change is desirable. Such an arrangement would save on costs of spoolers for the storage system and save some storage, but would have the disadvantage that one of the terminals would be tied up unnecessarily if retransmission from or to the other terminal were required. Further, a terminal such as processor interface 172 might be occupied for the duration of a 9600 bit per second transmission instead of accepting data at 64 or 128 kilobits per second.

It is to be understood that the above description is only of one preferred embodiment of the invention. Numerous other arrangements may be devised by one skilled in the art without departing from the spirit and scope of the invention. The invention is thus limited only as defined in the accompanying claims.

We claim:

1. In a switched communications network connectable to a plurality of facsimile sources and facsimile destinations, the network comprising storage, a method of transmitting facsimile image signals, comprising the steps of:
   in response to receiving, from a facsimile source, an identification of a facsimile destination, establishing a connection from said source to said storage;
   responsive to establishing said connection, transmitting the image signals over the connection from the facsimile source to the storage; and
   transmitting the image signals over the network from the storage to the identified destination.

2. In a switched communications network connectable to a plurality of facsimile sources and facsimile destinations, the network comprising storage, a method of transmitting facsimile image signals, comprising the steps of:
   in response to receiving from a communication source an identification of a communication destination, determining that the communication source is a source of facsimile image signals;
   in response to said determining, establishing a connection in the switched communications network from said source to said storage;
   responsive to establishing said connection, transmitting the image signals over the connection from the facsimile source to the storage; and
   transmitting the image signals over the network from the storage to the identified destination.

3. The method of claim 1 or 2 further comprising the steps of:
   transmitting an identification representing the source of the facsimile image signal to the network; and
   following the step of transmitting to the destination, transmitting a message to the source, identified by the identification representinng the source, the message comprising confirmation of the transmitting to the destination.

4. The method of claim 1 or 2 further comprising the steps of:
   transmitting a first message from said storage to a switch connected to the destination, the message comprising a facsimile message received indication; and
   responsive to reception of a second message from the switch connected to the destination, deferring transmission of the image signals from storage.

5. The method of claim 4 further comprising the step of:
   responsive to reception of a third message from the switch connected to the destination, transmitting the image signals from storage to that switch.

6. The method of claim 1 wherein the step of establishing a connection comprises:
   determining that the destination is a destination for facsimile image signals.

7. The method of claim 6 wherein the determining step comprises the step of:
   receiving a message from a switch of said network identifying said destination as a facsimile destination.

8. The method of claim 1 or 2 wherein the step of establishing a connection comprises the step of establishing the connection in a public switched network.

9. The method of claim 8 further comprising the steps of:
   identifying the source; and
   transmitting signals representing an identification of the source to the storage.

10. The method of claim 9 further comprising the steps of:
    transmitting the image signals from storage to the destination; and
    following said transmitting to the destination, transmitting a confirmation message to the facsimile source.

11. The method of claim 1 or 2 wherein the step of transmitting the image signals from storage comprises the step of converting the protocol of image signals received from the facsimile source to a different protocol for image signals to be transmitted to the facsimile destination.

12. The method of claim 1 or 2 wherein the step of transmitting to the destination comprises the step of transmitting to the destination at a data rate different from the data rate used for transmitting to storage.

13. The method of claim 1 or 2 further comprising the steps of:
    prior to establishing said connection from said source to said storage, in response to receiving from said source said identification of said destination, determining whether said destination is available;

if it is determined that said destination is available, establishing a connection to said destination for transmission of said image signals from said source to said destination; and if it is determined that said destination is not available, establishing said connection to said storage.

14. The method of claim 13 wherein said step of establishing a connection to said destination comprises the steps of:

determining if said destination accepts signals at the transmission rate of said image signals from said source; and if said determining of acceptance of signals is positive, and it is determined that said destination is available, establishing said connection to said destination.

15. A communications network comprising:

a first switch, comprising means for storing facsimile signals, for receiving and transmitting facsimile signals;

a second switch for connection to a source of facsimile signals;

the second switch controlled by a program for transmitting a destination indication and facsimile signals received from said source to said first switch in response to determining that the source is a source of facsimile signals and to receiving signaling information from the source representing said destination indication;

the first switch storing the facsimile signals for subsequent transmission to a third switch connected to a destination for the facsimile signals, said destination specified by said destination indication.

16. The network of claim 15 wherein said first switch further comprises means for receiving said facsimile signals at one data rate and for transmitting said facsimile signals at a different data rate.

17. The network of claim 16 wherein said first switch further comprises means for converting said facsimile signals received in one protocol to said facsimile signals in a different protocol.

18. The network of claim 15 wherein said second switch is further controlled by said program for determining an identification of said source and for transmitting said identification to said first switch;

said first switch responsive to receiving said identification of said source for transmitting a confirmation message to said source after transmitting said facsimile signals to said destination.

19. In a public switched communications network connectable to a plurality of facsimile sources and facsimile destinations, the network comprising storage, a method of transmitting facsimile image signals comprising the steps of:

dialing a number for identifying a facsimile destination, from a facsimile source into the network;

determining that the source is a source of facsimile image signals;

establishing a connection from the facsimile source to the storage;

transmitting the image signals from the facsimile source to the storage;

transmitting a number representing the destination to the storage;

transmitting a number representing the source of the facsimile image signal to the storage;

transmitting a first message to a switch connected to the destination, the message comprising a facsimile message received indication;

responsive to reception of a second message from the switch connected to the destination, deferring transmission of the image signals from storage;

responsive to reception of a third message from the switch connected to the destination, transmitting the image signals from storage to the facsimile destination; and transmitting a fourth message from the storage to the source, identified by the number representing the source, the fourth message comprising data confirming the transmitting to the destination.

20. The method of claim 19 wherein the step of transmitting the image signals from storage to the switch connected to the destination comprises converting signals received from the source in a first protocol to signals transmitted to the destination in a second protocol.

21. The method of claim 19 wherein the step of transmitting the image signals to the storage comprises performing a handshake operation between the facsimile source and an interface to the storage.

22. A method of transmitting a facsimile message over a communication network comprising the step of:

responsive to receipt of an identification of a facsimile destination from a facsimile communication path, establishing a connection over said network from said path to said storage system for storage of said message.

23. The method of claim 22 wherein said establishing step comprises establishing a connection from said path to said destination for direct delivery of said message and to said storage system for subsequent delivery of said message.

24. The method of claim 22 further comprising the step of:

storing said message in said storage system; and following said storing step, delivering said message to said destination over said network.

25. The method of claim 24 wherein said establishing step comprises:

responsive to a calling facsimile station dialing only a number identifying said facsimile destination, receiving said identification over said path at a switching office.

* * * * *

UNITED STATES PATENT AND TRADEMARK OFFICE
CERTIFICATE OF CORRECTION

PATENT NO. : 4,922,348

DATED : May 1, 1990

INVENTOR(S) : Alexander C. Gillon, Adam V. Reed, John M. Scanlon

It is certified that error appears in the above-identified patent and that said Letters Patent is hereby corrected as shown below:

Claim 17, column 9, line 41, before "in" insert --transmitted--.

Signed and Sealed this

Fifth Day of November, 1991

Attest:

HARRY F. MANBECK, JR.

*Attesting Officer*  *Commissioner of Patents and Trademarks*

REEXAMINATION CERTIFICATE (2409th)
United States Patent [19]
Gillon et al.

[11] B1 4,922,348

[45] Certificate Issued  Oct. 11, 1994

[54] FACSIMILE SERVICE

[75] Inventors: Alexander C. Gillon, Bedminister; Adam V. Reed, Morganville; John M. Scanlon, Mendham, all of N.J.

[73] Assignee: American Telephone and Telegraph Company, New York, N.Y.

Reexamination Request:
No. 90/003,020, Apr. 5, 1993

Reexamination Certificate for:
Patent No.: 4,922,348
Issued: May 1, 1990
Appl. No.: 309,586
Filed: Feb. 10, 1989

Certificate of Correction issued Nov. 5, 1991.

[51] Int. Cl.[5] .................. H04N 1/32; H04N 1/21
[52] U.S. Cl. ....................... 358/407; 358/434; 358/440; 358/442; 379/94; 379/100
[58] Field of Search ............... 358/402, 403, 407, 404, 358/444, 405, 434, 435, 436, 437, 438, 439, 440, 442; 379/100, 93, 94, 96, 97, 98

[56] References Cited
U.S. PATENT DOCUMENTS

| | | | |
|---|---|---|---|
| 4,153,916 | 5/1979 | Miwa et al. | 358/439 |
| 4,613,907 | 9/1986 | Yoshimoto et al. | 358/439 |
| 4,642,697 | 2/1987 | Wada | 379/100 |
| 4,661,857 | 4/1987 | Kondo | 358/439 |
| 4,677,660 | 6/1987 | Yoshida | 379/100 |
| 4,769,719 | 9/1988 | Endo | 358/403 |
| 4,800,439 | 1/1989 | Yoshino | 379/100 |
| 4,811,385 | 3/1989 | Watanabe | 379/100 |
| 4,821,312 | 4/1989 | Horton et al. | 379/100 |
| 4,852,153 | 7/1989 | Streck | 379/100 |
| 4,908,851 | 3/1990 | Kotani et al. | 379/100 |
| 4,994,926 | 2/1991 | Gordon et al. | 358/407 |
| 5,014,296 | 5/1991 | Saigano | 379/100 |
| 5,022,071 | 6/1991 | Mozer et al. | 379/100 |
| 5,153,912 | 10/1992 | Sakakibara et al. | 379/100 |
| 5,155,601 | 10/1992 | Toyama | 358/407 |

OTHER PUBLICATIONS

K. Yuki et al., "Facsimile Intelligent Communication System (FICS-2) Outline", *Review Of The Electrical Communication Laboratories,* vol. 31, No. 4, 1983, pp. 467–474.

"Flexible Facsimile Transmission", *Telecommunications,* Mar. 1980, pp. 39–40, 42

*Primary Examiner*—Scott A. Rogin

[57] ABSTRACT

This invention relates to an arrangement for efficiently transmitting facsimile signals from a facsimile source to a facsimile destination using a standard facsimile user interface. The connected switched communications network recognizes that the call is from a facsimile source or to a facsimile destination and causes the facsimile signals to be transmitted at the transmission speed of the source to storage in a network. Subsequently, the signals are transmitted from storage to a facsimile destination at the transmission speed of the destination when the destination becomes available. Advantageously, the source need not wait for the destination to become available before transmitting, and the transmission can take place at a bit rate that matches the source and the destination even when these bit rates are different. Retransmission because of errors in one link is only required for that link, i.e., from the source to the storage or from the storage to the destination. Advantageously, this is accomplished without changing the very simple user interface of prior art facsimile transceivers.

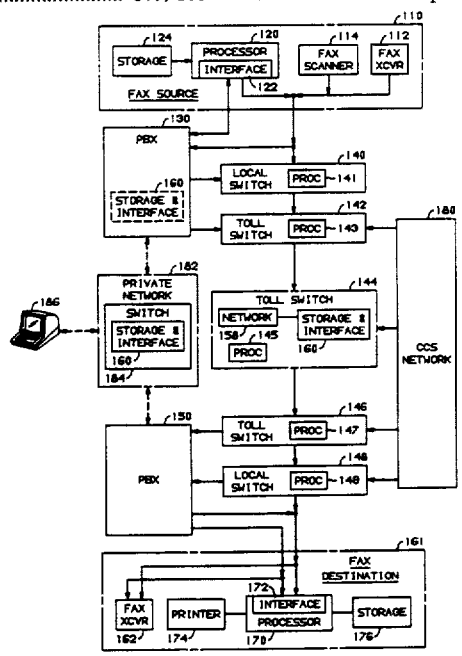

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 15-18 is confirmed.

Claims 1, 20, and 22-25 are cancelled.

Claims 2-6, 8-13, 19 and 21 are determined to be patentable as amended.

Claims 7 and 14 dependent on an amended claim, are determined to be patentable.

New claims 26-28 are added and determined to be patentable.

2. In a switched communications network connectable to a plurality of *communication terminals, including* facsimile sources and facsimile destinations, the network comprising *a program controlled switching system providing* storage, *and the network further comprising a plurality of local switches for serving originating and terminating telephone requests,* a method of transmitting facsimile image signals, comprising the steps of:

[in response to receiving from a communication source an identification of a communication destination,]

*in a first local switch controlled by a processor means under the control of a program, receiving from a communication source that is one of said communication terminals a normal destination number, without a special facsimile prefix, for identifying a communication destination;*

*in said processor means of said first local switch, under the control of said program, determining a class of service of said communication source;*

*responsive to* determining that [the] *said class of service is for a* communication source *that* is a source of facsimile image signals[;] , *under the control of said program,* [in response to said determining, ] establishing a connection in the switched communications network, from said source to [said storage] *said program controlled switching system;*

*transmitting said normal destination number to said program controlled switching system;*

*in said program controlled switching system, extending said connection to said storage;* responsive to establishing said *extended* connection, transmitting the image signals over the connection from the facsimile source to the storage; and

*subsequently,* transmitting, *under the control of said program controlled switching system,* the image signals over the network from the storage to [the identified] *a facsimile* destination *served by a second local switch and identified by said normal destination number.*

3. The method of claim [1 or] 2 further comprising the steps of:

transmitting *from said first local switch* an identification representing the source of the facsimile image signal to [the network] *said program controlled switching system;* and following the step of transmitting to the destination, transmitting a message to the source, identified by the identification representing the source, the message comprising confirmation of the transmitting to the destination.

4. The method of claim [1 or] 2 further comprising the steps of:

transmitting a first message from said [storage] *program controlled switching system* to [a] *said second local* switch [connected to the destination], the message comprising a facsimile message received indication; and responsive to reception of a second message *by said program controlled switching system* from [the] *said second local* switch, [connected to the destination,] deferring transmission of the image signals from *said* storage.

5. The method of claim 4 further comprising the step of:

responsive to reception of a third message from [the] *said second local* switch, [connected to the destination,] transmitting the image signals from storage *of said program controlled switching system* to [that] *said second local* switch.

6. The method of claim [1] *2* wherein the step of edtablishing a connection comprises:

determining that the destination is a destination for facsimile image signals.

8. The method of claim [1 or] 2 wherein the step of establishing a connection comprises the step of establishing the connection in a public switched network.

9. The method of claim 8 further comprising the steps of: identifying the source; and transmitting signals representing an identification of the *communication* source to [the storage] *said program controlled switching system.*

10. The method of claim 9 further comprising the [steps] *step* of:

[transmitting the image signals from storage to the destination; and] following said transmitting to the destination, transmitting a confirmation message to the [facsimile] *communication* source.

11. The method of claim [1 or ] 2 wherein the step of transmitting the image signals from storage comprises the step of converting the protocol of image signals received from the [facsimile] *communication* source to a different protocol for image signals to be transmitted to the facsimile destination.

12. The method of claim [1 or] 2 wherein the step of transmitting to the destination comprises the step of transmitting to the destination at a data rate different from the data rate used for transmitting to storage.

13. The method of claim [1 or] 2 further comprising the steps of:

prior to establishing said *extended* connection from said source to said storage, in response to receiving from said source said identification of said destination, determining whether said destination is available;

if it is determined that said destination is available, establishing a connection to said destination for transmission of said image signals from said source to said destination; and if it is determined that said destination is not available, establishing said connection to said storage.

19. [In a public switched communications network connectable to a plurality of facsimile sources and facsimile destinations, the network comprising storage, a method of transmitting facsimile image signals comprising the steps of:

dialing a number for identifying a facsimile destination, from a facsimile source into network;

determining that the source is a source of facsimile image signals;

establishing a connection from the facsimile source to the storage;

transmitting the image signals from the facsimile solurce to the storage;

transmitting a number representing the destination to the storage;

transmitting a number representing the source of the facsimile image signal to the storage; ]

*The method of claim 2 further comprising:* transmitting a first message to [a] *said second local* switch, [connected to the destination,] the message comprising a facsimile message received indication;

responsive to reception of a second message from the *second local* switch, [connected to the destination,] deferring [transmission of] *the steps of transmitting* the image signals from storage;

responsive to reception of a third message from the switch connected to the destination, transmitting the image signals from storage to the facsimile destination; and transmitting a fourth message from the storage to the source, identified by the number representing the source, the fourth message comprising data confirming the transmitting to the destination.

21. The method of claim [19] *2* wherein the step of transmitting the image signals to the storage comprises performing a handshake operation between the facsimile source and an interface to the storage.

*26. The apparatus of claim 15 wherein said second switch:*

*is a local switch;*

*determines that the source is a source of facsimile signals by making a class of service translation for said source; and*

*receives signaling information that contains only a normal destination number, without a special facsimile prefix, for representing said destination indication.*

*27. The apparatus of claim 26 wherein said second switch is further controlled by a program for initiating the establishment of a connection from said source to said destination; and*

*if said destination is not available, establishing said connection to said first switch.*

*28. The apparatus of claim 15 wherein said second switch is further controlled by a program for initiating the establishment of a connection from said source to said destination; and*

*if said destination is not available, establishing said connection to said first switch.*

* * * * *